(No Model.)

6 Sheets—Sheet 1.

J. J. BUSENBENZ.
TIME RECORDER.

No. 596,691. Patented Jan. 4, 1898.

Witnesses:
Ray Hutchins
Richard Skinner

Inventor:
Jacob J. Busenbenz,
By Dyrenforth & Dyrenforth,
Attorneys.

(No Model.) 6 Sheets—Sheet 3.

J. J. BUSENBENZ.
TIME RECORDER.

No. 596,691. Patented Jan. 4, 1898.

Witnesses:
Ray Hutchins
Richard Spencer

Inventor:
Jacob J. Busenbenz,
By Dyrenforth & Dyrenforth,
Attorneys.

THE NORRIS PETERS CO., PHOTO-LITHO., WASHINGTON, D. C.

(No Model.)  6 Sheets—Sheet 4.
J. J. BUSENBENZ.
TIME RECORDER.
No. 596,691.  Patented Jan. 4, 1898.
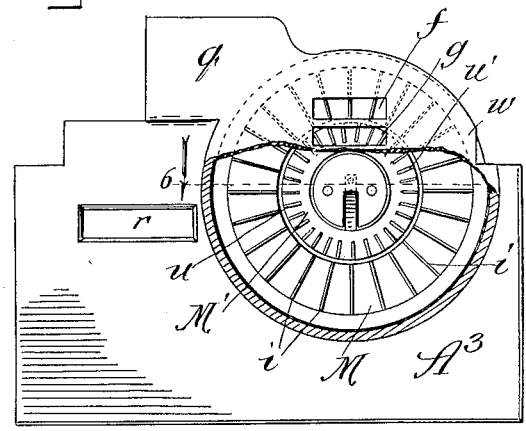
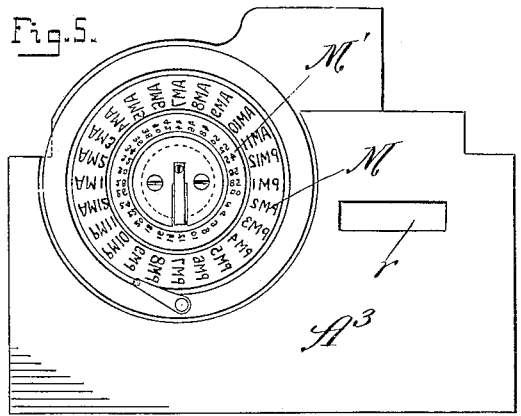
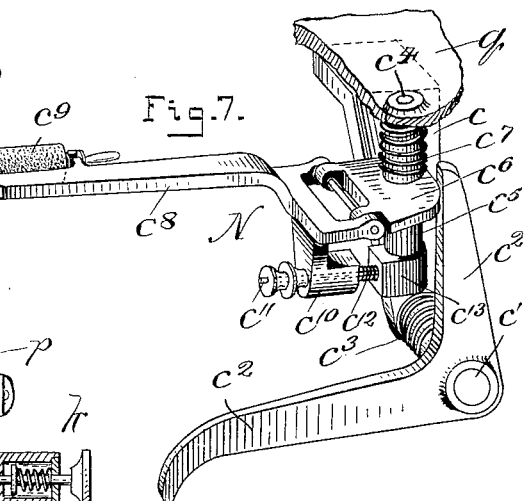
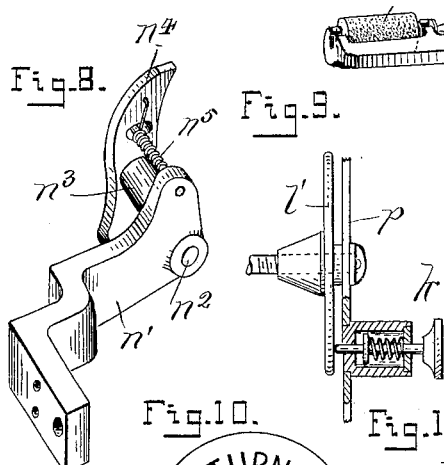
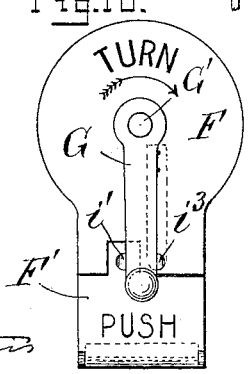
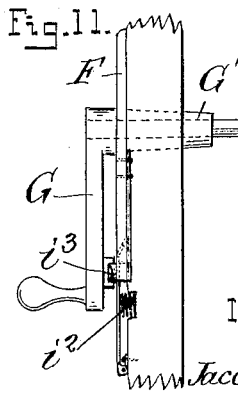
Witnesses:
Ray H. Hutchins
Richard Spencer
Inventor:
Jacob J. Busenbenz,
By Dyrenforth & Dyrenforth,
Attorneys.

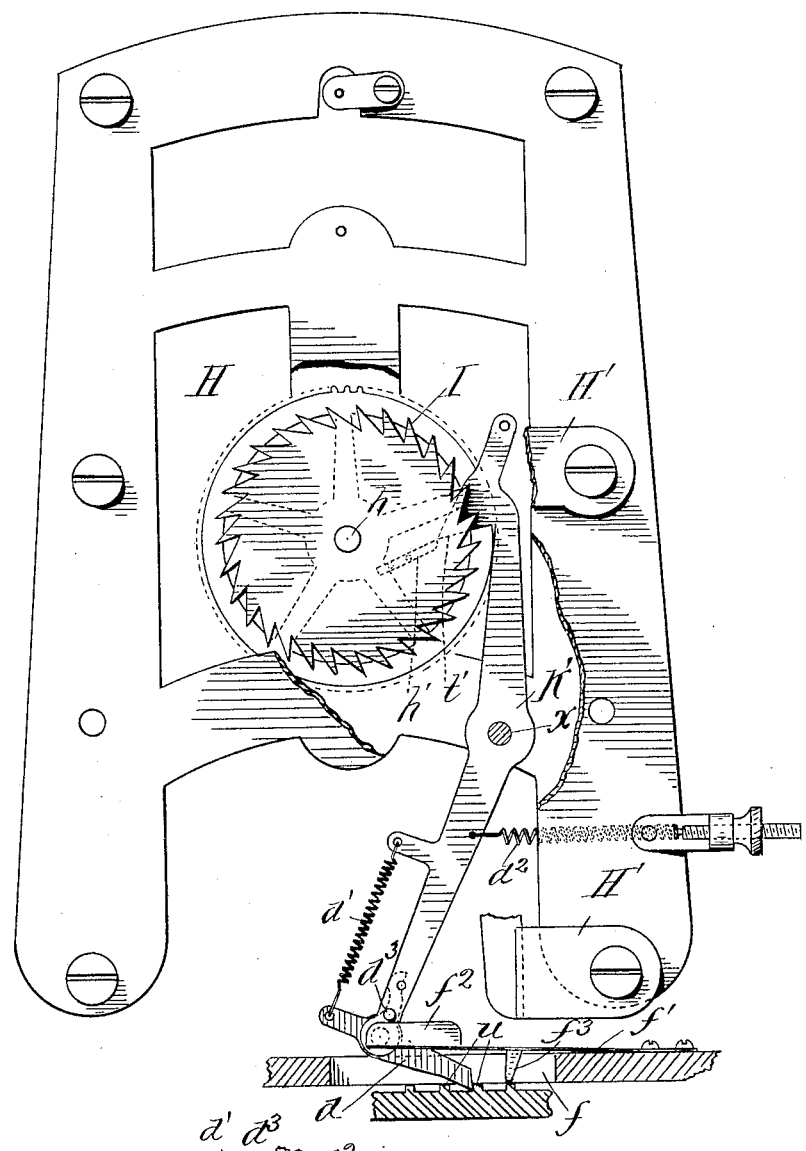

(No Model.) 6 Sheets—Sheet 6.

J. J. BUSENBENZ.
TIME RECORDER.

No. 596,691. Patented Jan. 4, 1898.

Witnesses:
Ray Hutchins
Richard Spencer

Inventor:
Jacob J. Busenbenz
By Dyrenforth & Dyrenforth,
Attorneys.

UNITED STATES PATENT OFFICE.

JACOB J. BUSENBENZ, OF CHICAGO, ILLINOIS, ASSIGNOR TO THE NATIONAL TIME RECORDER COMPANY, OF SAME PLACE.

TIME-RECORDER.

SPECIFICATION forming part of Letters Patent No. 596,691, dated January 4, 1898.

Application filed November 10, 1896. Serial No. 611,584. (No model.)

*To all whom it may concern:*

Be it known that I, JACOB J. BUSENBENZ, a citizen of the United States, residing at Chicago, in the county of Cook and State of Illinois, have invented a new and useful Improvement in Time-Recorders, of which the following is a specification.

My invention relates to an improvement in the class of devices now in quite common use in business houses and factories for recording the time of the arrival, departure, absence, and the like of employees, for recording the time of receiving and finishing orders for work, and for various other purposes with relation to which it is desirable to have a time-record.

More particularly stated, my invention relates to the class of autograph time-recorders, meaning the kind presenting a space for signature by the person whose time is to be recorded and who operates the device, after recording his signature, to cause it to print the time of signing by the action of suitable printing mechanism controlled by a clock-movement.

The more salient features of my improvement relate to the construction and operation of the paper-carriage, to adapt it, by being raised and lowered through the medium of the operating-handle, to feed the record-paper, cause the latter to be imprinted with the time of recording the signature, and actuate the inking apparatus, to the mechanism for locking and unlocking the carriage, to the printing mechanism, and to the setting mechanism for the printing-wheels.

My invention consists in the general construction of the novel features of my improved time-recorder, and it also consists in details of construction and combinations of parts, all as hereinafter more particularly described, and pointed out in the claims.

Figure 1:
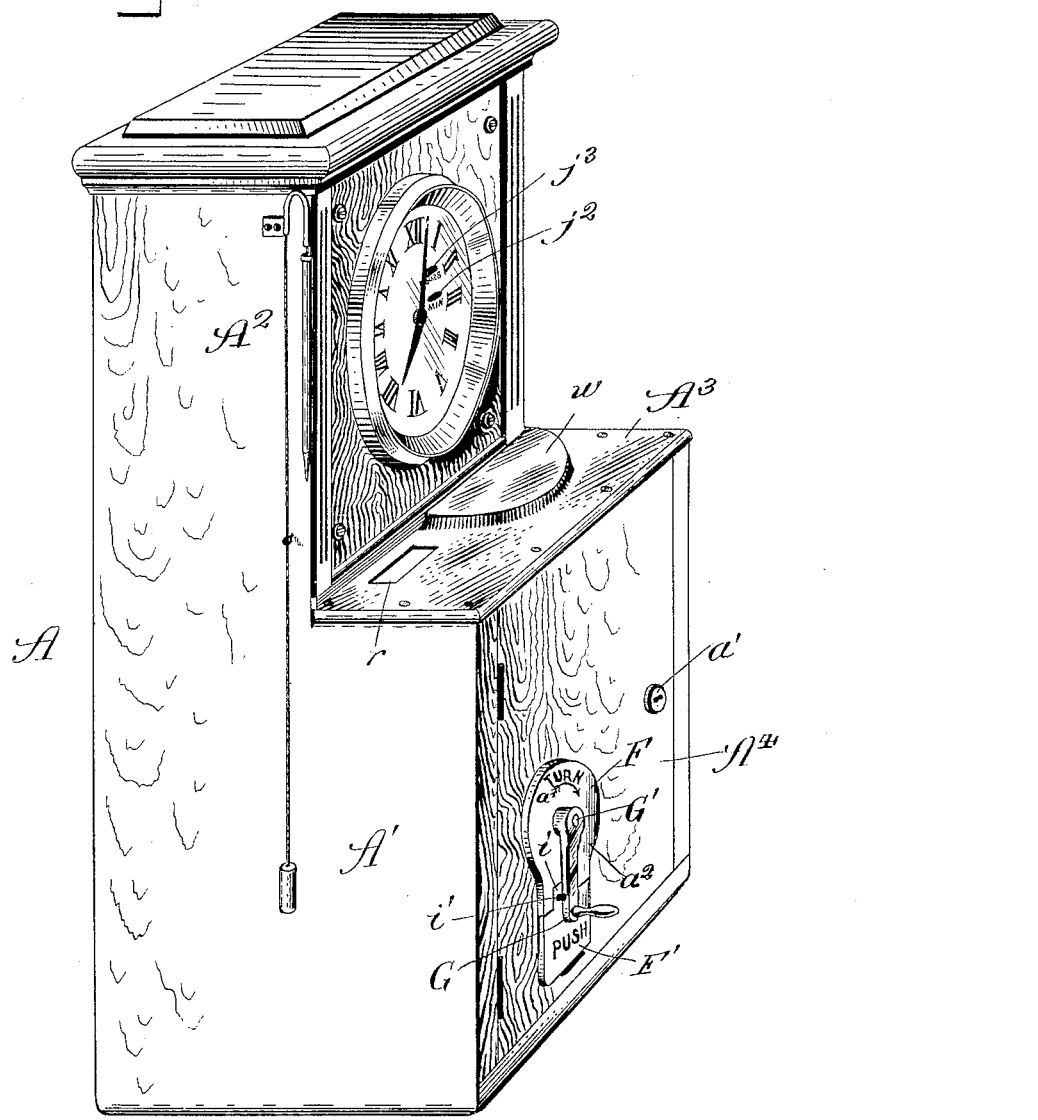
Figure 2:
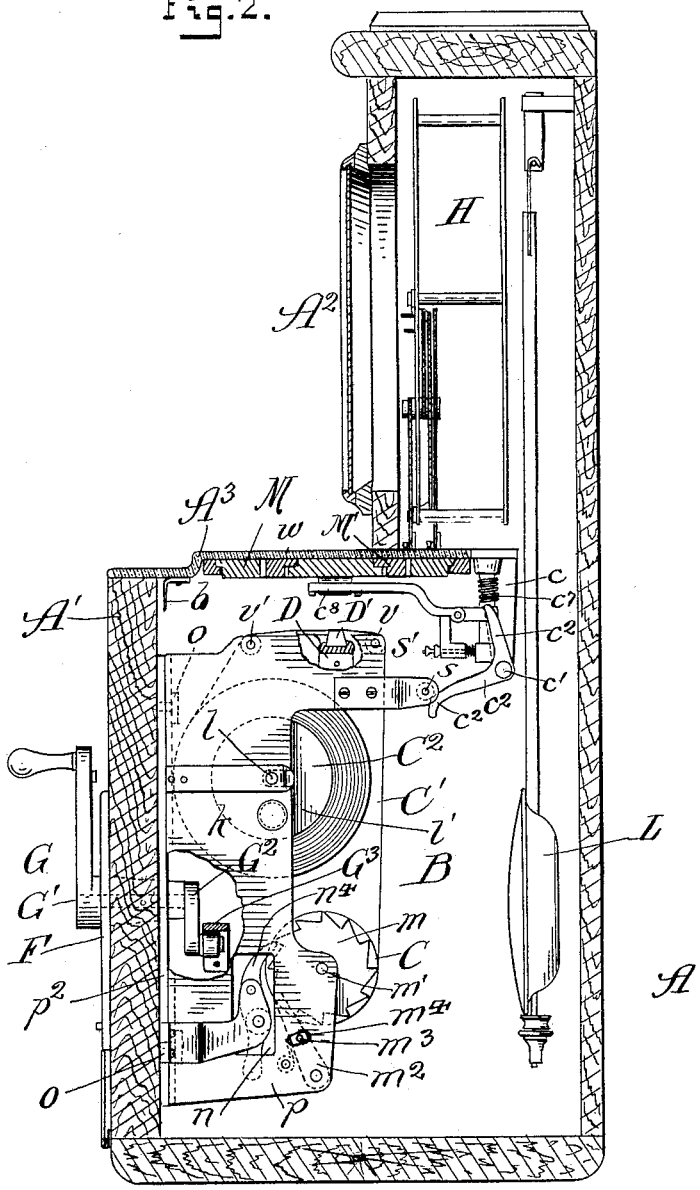
Figure 3:
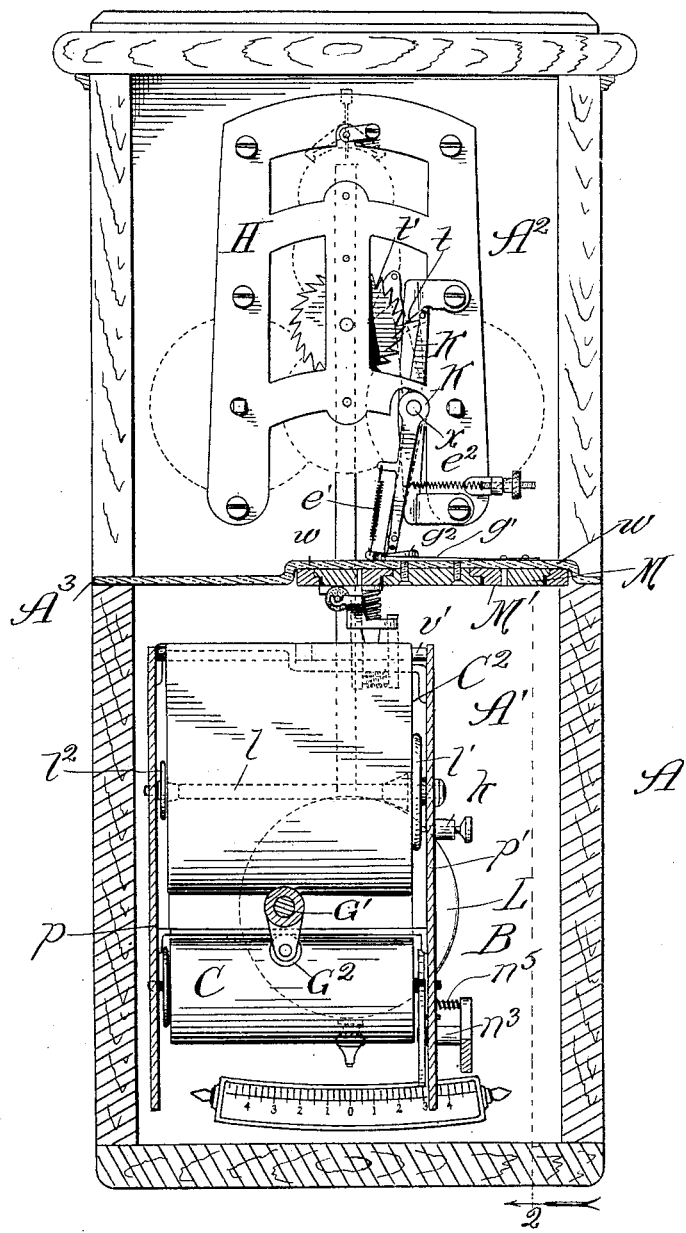
Figure 14:
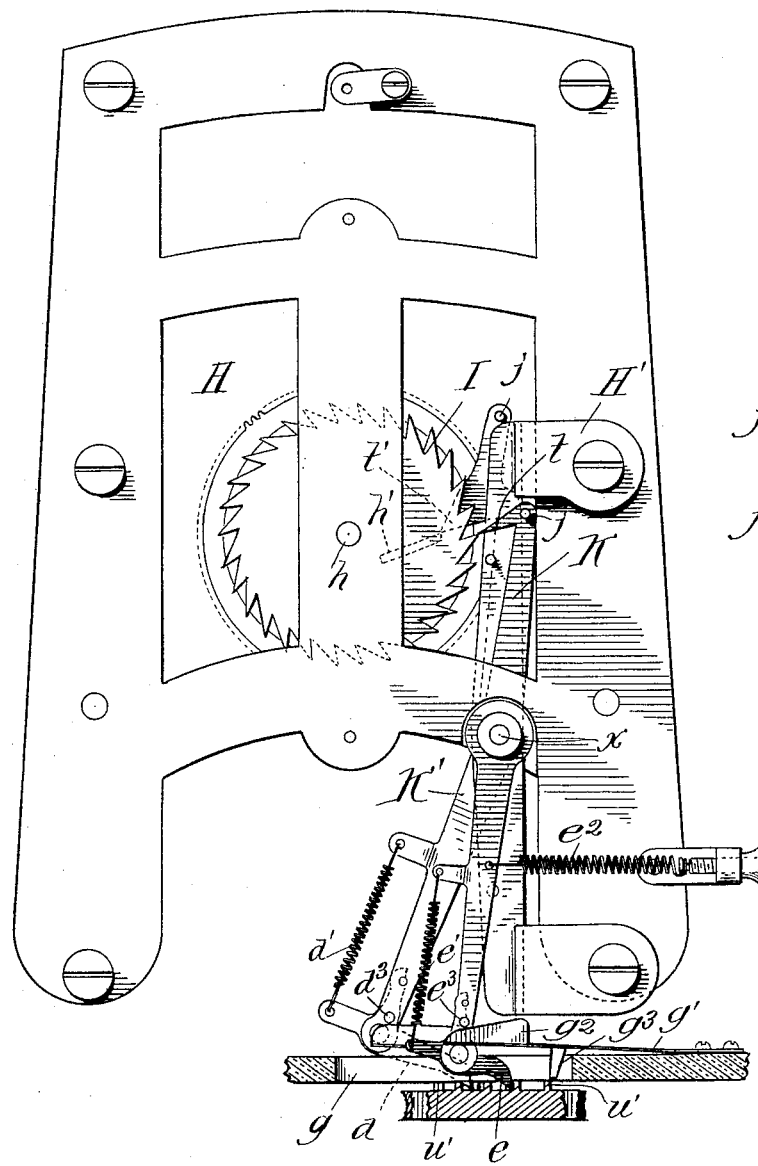
Figure 15:
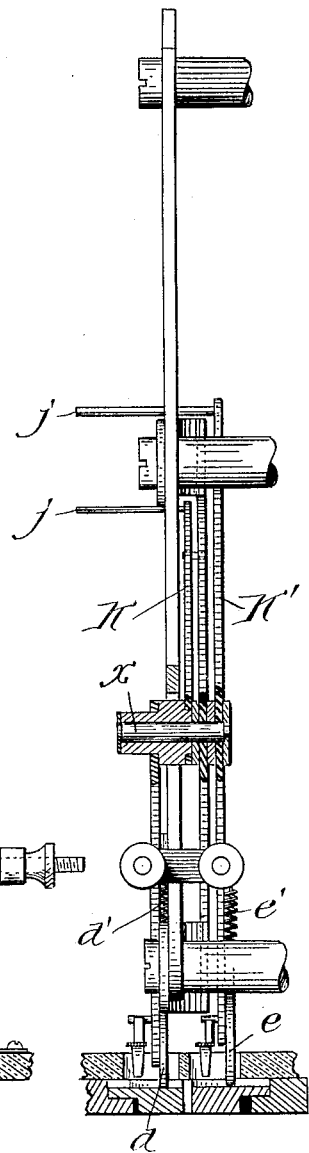

Referring to the accompanying drawings, Figure 1 is a perspective view of my improved time-recorder; Fig. 2, a partly broken section taken at the line 2 2 on Fig. 3 and viewed as indicated by the arrows; Fig. 3, a view presenting the mechanism of the device in front elevation, the front of the inclosing case being removed to disclose the mechanism; Fig. 4, a top plan view of the concentric printing-wheels with a portion of their cover broken away to disclose them; Fig. 5, a bottom plan view of the same; Fig. 6, a section taken at the line 6 on Fig. 4 and viewed in the direction of the arrow; Fig. 7, a broken perspective view of the inking attachment for the printing-wheels; Fig. 8, a similar view of the paper-feeding pawl; Fig. 9, a broken view in elevation, partly sectional, of a friction detail; Fig. 10, a view in front elevation of the operating-handle and its lock; Fig. 11, a view showing the same in side elevation; Fig. 12, a broken view in front elevation, partly sectional, of the hour-printing wheel in the act of being released, with the mechanism for operating it under the control of a clock-movement; Fig. 13, a broken sectional view showing the hour-printing wheel, its actuating-pawl and detent, with the parts in the relative positions occupied by them after the wheel has been turned; Fig. 14, a view like that presented by Fig. 12, but showing in addition the minute-printing wheel and its actuating mechanism, the latter being in front of the hour-printing-wheel-actuating mechanism; and Fig. 15, a broken view in side elevation, partly sectional, of the mechanism illustrated in Fig. 14.

A is the case, shown as formed with the lower section A' wider from front to back and the upper correspondingly narrower section A², the offset between the two sections affording the table A³, provided in the upper left-hand corner with an oblong slot $r$.

The lower section A' of the case is covered by a door A⁴, shown as of the swinging variety and which supports the paper-carriage and the mechanism for actuating it. The paper-carriage B involves a frame composed of the two parallel side pieces $p$ and $p'$ and the face-plate $p^2$, at which the carriage is fastened upon the inner side of the door by means of screws $o$, passing through vertically-elongated slots, (not shown,) one of which is provided near each of the four corner portions of the face-plate. In the side $p$ of the carriage-frame is formed a vertically-elongated slot $n$, through which there projects laterally from the forward end portion of a bracket $n'$, Fig. 8, rigidly fastened to the inner side of the door A⁴, a stud $n^2$, surrounded by a sleeve $n^3$, carrying at its inner end a pawl $n^4$, provided with a controlling-spring $n^5$. The pawl $n^4$ tends normally to engage a ratchet-wheel $m$ on the end of a shaft $m'$, journaled in the opposite sides of the carriage-frame and carrying a longitudinally-slotted roll C for feeding the web of paper C', as hereinafter described, the roll being equipped with any suitable clamping device (not shown) to engage the slot for fastening the lower end portion of the web C' to the roll. Engaging with the ratchet-wheel $m$ is a spring-controlled detent $m^2$, provided with a handle $m^3$, projecting outward through a slot $m^4$ in the side $p'$ of the carriage-frame.

$C^2$ is the upper roll for carrying the web C', which is adjusted in place by leading it from the upper roll, about which it is wound, upward over guide-rollers $v$ and $v'$, journaled in the upper portion of the carriage-frame respectively near its rear and front, and thence down and into engagement with the feed-roll C. The roll $C^2$ is shown as comprising a shaft $l$, journaled at its opposite ends in suitable bearings in the carriage-frame and provided with heads $l'$ and $l^2$ at its opposite ends, between which the rolled web of paper is confined, and engaging with the head $l'$, through the side $p$ of the frame, is a spring-controlled friction-stud $k$ to apply tension to the upper roll in paying off the web.

At the inner upper end of the carriage-frame there project inward from the sides $p$ and $p'$ bearings $s'$ for a roller $s$, only one of which bearings is shown in Fig. 2, owing to the nature of the view selected for illustration. It will be readily understood, however, that the rod or roll $s$ extends from side to side of the frame. Between the two rollers $v$ and $v'$ is supported between the sides of the carriage-frame a plate D in position to be traversed by the horizontal section of the web C', this plate being near the left-hand side of the top of the carriage B to coincide with the slot $r$ when the door $A^4$ is closed, and on a plane about, say, half an inch backward or inward from the plate D and near the right-hand side of the top of the carriage B is supported an impression-pad D', which should yield or be of yielding material.

F is a plate fastened upon the front or outer side of the door $A^4$ and having a lower section F' hinged at its lower edge and provided on its opposite edge with a tongue $i$, extending into a corresponding recess in the lower edge of the plate F and carrying a stud $i'$, and behind the section F' is confined a spring $i^2$, tending normally to push it outward. On the plate F, adjacent to the stud $i'$, is supported a spring-stud $i^3$.

G is the operating-handle, shown as a crank carried by a stem G', journaled in the door $A^4$ through the plate F and carrying at its inner end a crank $G^2$, which engages a cross-bar $G^3$ from underneath, the cross-bar extending from side to side of the carriage-frame.

H is a clock-movement. That selected for use with my improved device is the ordinary eight-day Seth Thomas movement, which is too well known to require that it be described in this connection. On the shaft $h$ for the minute-hand is supported a ratchet-wheel I, having, by preference, thirty-two teeth, and the wheel I carries a cam $h'$ on its inner or rear side.

K and K' are levers fulcrumed at $x$ on a common axis having its bearing in a bracket H' on the clock-frame. The lever K is formed in two sections, the upper being fulcrumed at $x$ at its lower end to extend at the inner side of the front of the clock-frame and the lower being fulcrumed at its upper end to extend upon the outer side of the front of the clock-frame. The lever K' is formed in one continuous length. At their upper ends the levers K and K' are provided, respectively, with the teeth $t$ and $t'$, the former extending into the path of the teeth of the ratchet-wheel I and the latter extending into the path of the cam $h'$.

The table $A^3$ is extended inward into the case A nearly to its back, leaving only room enough for the action of the clock-pendulum L. A portion of the table is raised in the form of a circle, as shown at $w$, to form a housing for the printing-wheels M and M'. These are rotatably supported concentrically, the latter within the former, on suitable bearings covered by the housing $w$. The wheel M has cast upon its under side type arranged radially at twenty-four equal intervals, denoting the hours of the day from "1" to "12" and from "1" to "12," with the "A. M." sign before each number of one set and the "P. M." sign before each number of the other set. On its upper side the printing-ring M carries radially at equal intervals apart twenty-four ribs $u$, Fig. 4. The printing-wheel M' has cast upon its under side in radial arrangement at equal intervals apart numbers, beginning with "0 0" and thence progressing by twos—thus "2" "4" "6" "8," &c., up to "58"—to designate two-minute intervals of time. On the upper side of the inner printing-wheel are arranged radially at equal intervals apart ribs $u'$, thirty in number, to correspond with the numbers on the under side.

In the plate $A^3$, in the section thereof which lies within the upper narrower portion of the case A and respectively in alinement with the lower ends of the levers K and K', are elongated slots $g$ and $f$, respectively, covered by the free ends of flat springs $g'$ and $f'$. The spring $g'$ carries on its upper side at its free end a cam $g^2$ and on its under side to the right of the cam a detent $g^3$, extending through the slot $g$ into the path of the ribs $u'$ on the inner type-wheel. The spring $f'$ carries on its upper side at its free end a cam $f^2$ and on its under side to the right of the cam a detent $f^3$, extending through the slot $f$ into the path of the ribs $u$ on the outer type-wheel.

The lever K carries at its lower end pivotally a pawl $e$, which projects through the slot $g$ and is resiliently held in position to engage at its forward end with the teeth or ribs $u'$ on the inner type-wheel by a spring $e'$, and a similar spring $e^2$ is connected with the lever K below its fulcrum to tend to pull it in the direction of engaging the pawl with the teeth in opposition to the action of the teeth of the ratchet-wheel I against the tooth $t$ at the upper end of the lever. Near the lower end of the lever K is an outwardly-projecting pin $e^3$, engaging the upper side of the cam $g^2$.

The lever K' carries at its lower end pivotally a pawl $d$, which projects through the slot $f$ and is resiliently held in position to engage at its forward end with the teeth or ribs $u$ on the outer type-wheel by a spring $d'$, and a similar spring $d^2$ is connected with the lever K' below its fulcrum to tend to pull it in the direction of engaging the pawl $d$ with the teeth $u$ in opposition to the action of the tooth $h$ against the tooth $t'$ at the upper end of the lever.

N is the inking attachment, Fig. 7. On the lower end of a bracket $c$, depending rigidly from an extension $q$ of the circular section $w$ of the plate or table $A^3$, is a rod $c'$, extending transversely of the bracket and having fulcrumed upon its end a bell-crank lever $c^2$, the lower forwardly-projecting arm of which is slightly curved in a downward direction, and a spring $c^3$ on the rod engages the bell-crank to tend to return it to its normal position when turned therefrom. Adjacent to the bracket $c$ there depends from the plate extension $q$ a pin $c^4$, having rotatably confined upon it a sleeve $c^5$, carrying a head $c^6$ and surrounded by a spring $c^7$, tending to return the sleeve to its normal position when turned therefrom. The head $c^6$ has hinged to it to yield upward and downward a bent lever $c^8$, carrying to rotate in suitable bearings near its outer end an inking-roller $c^9$, shown to be provided with a handle at one end to afford means for placing it in position. The inking-roller should be of the variety which retains the ink with which it is saturated and does not require frequent renewal. From the hinged end of the lever $c^8$ there depends a bearing $c^{10}$ for a set-screw $c^{11}$, secured at its inner end to a head $c^{13}$ on the lower end of the sleeve $c^5$, and between the head $c^{13}$ and the bearing $c^{10}$ there is confined about the set-screw a spring $c^{12}$, tending to force the lever $c^8$ yieldingly upward.

From the foregoing description of the mechanism of the inking attachment it will readily be seen that it is actuated by depressing the forwardly-projecting arm of the bell-crank $c^2$, owing to the engagement of the other arm with the head $c^6$, to turn the sleeve $c^5$ toward the left, and thereby sweep the lever $c^8$ and the inking-roller $c^9$ across the face of the wheels M and M' and thus across the face of the type thereon in the path of the ink-roller, and that on releasing the bell-crank the spring $c^7$ returns the arm $c^8$ and with it the roller $c^9$ to their normal positions.

The operation of my improved time-recorder is as follows: To enable the door $A^4$ to be closed, the carriage B thereon must be in its lowest position to avoid obstruction against closing by a pendent hook $b$ near the center of the front of the under side of the table $A^3$. This position, however, it does not occupy with the operating-handle G in its normal perpendicular position, (shown in Fig. 1,) since then the crank $G^2$ is slightly below its highest position of engagement with the cross-bar $G^3$, whereby the carriage is accordingly raised and the upper edge of the plate $p^2$ passes behind the hook $b$, which thus affords a stop against opening the door while the carriage is raised. To enable the door to be closed, the handle G must extend across the point marked $a$ on Fig. 1, where the crank $G^2$ is in its lowest position, (shown in Fig. 2,) with its top on a plane below that of the lower end of the hook $b$. With the door once closed and locked through the keyhole (represented at $a'$) it is not intended to be again opened, except by the person or persons authorized to do so, to remove the record printed on the web C', as hereinafter described, and readjust or renew the web. After the closure the handle G is turned in the direction indicated by the arrow on the plate F till it snaps over the spring-stud $i^3$ against the stop $i'$ and is thus confined or locked between the two. In turning the handle toward the last-named (its normal) position it correspondingly turns the crank $G^2$ to engage the cross-bar $G^3$ and accordingly raise the carriage till the handle reaches the position of crossing the point marked at $a^2$ on the plate F in Fig. 1, from which point, in turning the handle to its locked position, the crank $G^2$ is turned slightly beyond its highest position and allows the carriage to drop slightly by its own gravity.

With the door A closed and the operating-handle locked, as shown in Fig. 1, the device is in readiness for use as follows: The user first writes his name (with a pencil shown in in Fig. 1 to be conveniently suspended for the purpose) on the section of the web C', exposed through the slot $r$ in the table. Thereupon he presses the plate-section F' (marked "Push" on Fig. 1) to release the handle G from the stop $i'$, when the weight of the carriage B causes it to drop to its lowest position, and in so dropping it turns the operating-handle (by bearing against the crank $G^2$) till the handle reaches the position of extending across the point $a$. Of course, however, the operator may, if he desires, both press the section F' and manipulate the handle with one hand to control this drop of the carriage. In the drop of the carriage a tooth of the ratchet-wheel $m$ on the feed-roll C, engaged by the pawl $n^4$, bears against the latter and thereby turns the ratchet-wheel the extent of one tooth and with it the roll C, say to the extent of about one-half an inch or the distance corresponding with the distance of the impression-pad D' in advance of the plate D. This accordingly feeds the web C the same distance, and thus brings the recorded signature in alinement with the pad D'. The operator continues to turn the handle G toward the right, thereby raising the carriage and bringing the impression-pad D' and interposed section of the web C' against the radial line of type on the wheels M M' directly over it, whereby the time (hour and minute of the day) at which the name was written is printed on the web opposite the name. By continuing to turn the operating-handle past the point $a^2$ to its locked position and thereby raising the carriage the working end of the pawl $n^4$ is in the path of the serrated periphery of the ratchet-wheel $m$, whereby when the latter in rising passes the pawl a tooth of the wheel engages the latter until it passes it, when the pawl springs into the notch below it ready to engage it when the carriage is again lowered. This lowering takes place to a very slight extent soon after the handle passes the point $a^2$ till it reaches its locked perpendicular position, since then the crank $G^2$ has passed its highest point in engagement with the cross-bar $G^3$, and in this slight dropping of the carriage the roll is also slightly turned by engagement of the ratchet $m$ with the pawl $n^4$ and feeds the web accordingly, though the only purpose of this very slight drop of the carriage is to withdraw the web away from the face of the type to avoid interference with the movement of the type-wheels. In each drop of the carriage B with the movement of the operating-handle from its perpendicular locked position to that of crossing the point $a$ the rod $s$, which is permanently above the forwardly-projecting arm of the bell-crank $c^2$, when the door is closed, drops against that arm, thereby depressing it and swinging the lever $c^8$, with the inking-roller $c^9$, across the face of the type in the path of the roller to ink the type. With the subsequent rise of the feed-roller carriage the bell-crank is released, thereby releasing the lever $c^8$ and permitting the spring $c^7$ to return it to its normal position and carry with it the roller $c^9$.

The purpose of having the lever $c^8$ yieldingly supported is to adapt it to give to any unevenness in the type-surface on the wheels M and M'.

The outer type-wheel M is caused to make one complete revolution in each twenty-four hours, and the inner wheel M' is caused to make one complete revolution every hour. This is produced by the action of the clock-movement on the ratchet-wheel I, carrying the cam $h'$. Thus the ratchet-wheel is turned the extent of one of its thirty teeth every two minutes, and in turning it forces the lever K, at its tooth $t$, backward on its fulcrum until the ratchet-tooth passes the lever-tooth, meantime forcing the lower end of the lever in the contrary direction to withdraw the pawl $e$, carried by it, from engagement with a rib or tooth $u'$ on the upper side of the inner type-wheel and permit the spring $g'$ to rise and lift out of the path of the ribs $u'$ the detent $g^3$. As soon as the ratchet-tooth passes the lever-tooth $t$ the lever is snapped back by the recoil of its spring $e^2$ to bring its tooth into engagement with the next succeeding tooth of the ratchet-wheel I, and the consequent movement of the opposite end of the lever in the contrary direction forces the pawl $e$ against the next succeeding rib $u'$ on the inner type-wheel, thereby turning the latter the extent of one rib and also the extent of the space between two numbers on its under side, while the pin $e^3$ depresses the cam $g^2$ and with it the spring $g'$ to extend the detent $g^3$ through the slot $g$ into engagement with a rib $u'$. In this manner at the end of each two minutes of time type on the inner wheel M, denoting the minute in the hour, is brought into alinement with the impression-pad D'. Once in each revolution of the wheel I the cam $h'$ encounters the tooth $t'$ on the lever K', thereby in the manner described of the action of the lever K withdrawing the pawl $d$ on its lower end from engagement with a rib $u$ on the outer type-wheel M and permitting the spring $f'$ with its detent $f^3$ to rise till the cam $h'$ passes the lever-tooth, when the recoil of the lever-spring $d^2$ snaps the pawl $d$ against the next succeeding rib $u$ to turn the wheel M' the extent of one space between adjacent type-lines thereon and force the spring $f'$ down, by engagement of the pin $d^3$ with the cam $f^2$, to bring the detent $f^3$ into the path of the ribs $u$. In this manner the hour of the day, denoted by the type on the under side of the outer wheel M, is brought into vertical alinement with the impression-pad and into longitudinal alinement with the minute of the day to which the hour relates, so that in turning the operating-handle G at any time after writing a name through the slot $r$ the time of the writing will be recorded on the web C'.

It will be noticed that there are provided to project forward or outward from the upper ends of the levers K and K' pins $j$ and $j'$, which extend through elongated openings $j^2$ and $j^3$ in the clock-dial. These pins afford handles by means of which to conveniently work the levers by hand, each independently of the other, for the purpose of turning the type-wheels to set them with relation to the time indicated by the clock.

The somewhat complicated nature of the mechanism involved in my improved time-recorder has necessitated the foregoing minute description of the details of its construction to enable it and the operation to be comprehended by those skilled in the art to which my improvement relates. I do not wish to be understood, however, as desiring to limit my invention to such details of construction, but intend that the scope of the appended claims shall be in accordance with the terms in which they are expressed with regard to the state of the prior art.

What I claim as new, and desire to secure by Letters Patent, is—

1. In a time-recorder, the combination with clock-movement-actuated printing mechanism, of a vertically-movable carriage carrying paper-feeding mechanism and a support for the paper to be printed, and a rotatable handle provided with a crank operatively connected with said carriage and adapted when actuated to raise said support and to carry the support and paper against the type of the said printing mechanism to impress the paper, substantially as described.

2. In a time-recorder, the combination with clock-movement-actuated printing mechanism, of a vertically-movable carriage carrying paper-feeding mechanism and a support for the paper to be printed, a handle connected with said carriage and adapted when actuated to raise said support and the paper, and to carry the support and paper against the type of the said printing mechanism to impress the paper, and a stationary pawl engaging a ratchet on the paper-feed roll to move the paper as the carriage is lowered, substantially as described.

3. In a time-recorder, the combination of an inclosing case, a clock-movement in the upper part of said case, printing mechanism actuated by said clock-movement, a table interposed between the upper and lower portions of the case and having an opening, a carriage vertically movable in the lower portion of the case and carrying paper-feeding mechanism and a support for the paper to be printed, and a rotatable handle provided with a crank operatively connected with said carriage and adapted when actuated to raise said support to bring the paper to said opening and to carry the support and paper against the type of the said printing mechanism, substantially as described.

4. In a time-recorder, the combination of an inclosing case, a clock-movement in the upper part of said case, printing mechanism actuated by said clock-movement, a table interposed between the upper and lower portions of the case and having an opening, a door covering the lower portion of the case, a carriage vertically movable in supports on the inner side of the door and carrying paper-feeding mechanism and a support for the paper to be printed, and a rotatable handle provided with a crank operatively connected with said carriage and adapted when actuated to raise said support to bring the paper to said opening and to carry the support and paper against the type of the said printing mechanism, substantially as described.

5. In a time-recorder, the combination of an inclosing case, a clock-movement in the upper part of said case, printing mechanism actuated by said clock-movement, a table interposed between the upper and lower portions of the case and having an opening for exposing the web to write thereon, a door covering the lower portion of the case, a carriage comprising a frame supported on the inner side of the door and movable up and down with relation to the type of said printing mechanism and table, an upper roll and a lower roll on said frame and movable therewith and carrying between them the web to be printed, a plate supported near the top of the frame to register with said opening and an impression-pad similarly supported in advance of said plate to register with the printing mechanism, over which said plate and pad said web is drawn, feed mechanism for the web comprising a ratchet on one of said rolls and a pawl engaged by the ratchet, and a handle connected with said frame to operate it, substantially as described.

6. In a time-recorder, the combination of an inclosing case, a clock-movement in the upper part of said case, printing mechanism actuated by said clock-movement, a table interposed between the upper and lower portions of the case and having an opening for exposing the web to write thereon, a door covering the lower portion of the case, a carriage comprising a paper-carrying frame supported on the inner side of the door and movable up and down with relation to said printing mechanism, an upper roll and a lower roll on said frame carrying between them the web to be printed, a plate supported near the top of the frame to register with said opening and an impression-pad similarly supported in advance of said plate to register with the printing mechanism, over which said plate and pad said web is drawn, feed mechanism for the web comprising a ratchet on one of said rolls and a pawl engaged by the ratchet, a crank journaled in the door to engage said frame and raise and lower it by turning the crank, and an operating-handle connected with the crank, substantially as described.

7. In a time-recorder, the combination of an inclosing case, a clock-movement in the upper part of said case, printing mechanism actuated by said clock-movement, a table interposed between the upper and lower portions of the case and having an opening, a door covering the lower portion of the case, a carriage vertically movable in supports on the inner side of the door and carrying paper-feeding mechanism and a support for the paper to be printed, a crank engaging the paper-feeding mechanism, a handle connected with said crank and adapted when actuated to raise said paper-feeding mechanism and the support to bring the paper to said opening and to carry the support and paper against the type of the said printing mechanism, and a spring-lock for said handle, substantially as described.

8. In a time-recorder, the combination of an inclosing case, a clock-movement in the upper part of said case, printing mechanism actuated by said clock-movement, a table interposed between the upper and lower portions of the case and having an opening for exposing the web to write thereon, a door covering the lower portion of the case, paper-feeding mechanism supported on the inner side of the door and movable up and down with relation to said printing mechanism, a crank engaging and actuating the paper-feeding mechanism, an operating-handle connected with said crank, and a lock for the handle comprising a spring-plate carrying a stop for one side of the handle, and a spring-stud for the opposite side thereof, substantially as described.

9. In a time-recorder, the combination with clock-movement-actuated printing mechanism, of a vertically-movable carriage carrying paper-feeding mechanism and a support for the paper to be printed, a rotatable handle provided with a crank operatively connected with said carriage and adapted when actuated to raise said support and to carry the support and paper against the type of the said printing mechanism, and an inking attachment for the printing mechanism supported in the path of the carriage to be actuated thereby, substantially as described.

10. In a time-recorder, the combination with clock-movement-actuated printing mechanism, of a carriage carrying paper-feeding mechanism, movable up and down with relation to said printing mechanism, a handle connected with the carriage to operate it, and an inking attachment supported adjacent to said printing mechanism and comprising a lever pivotally supported to sweep across the face of the printing mechanism and carrying an inking-roller, and a bell-crank lever for actuating said lever and having one arm extended into the path of movement of said carriage, substantially as described.

11. In a time-recorder, the combination with clock-movement-actuated horizontally-disposed concentric printing-rings, of a carriage carrying paper-feeding mechanism, movable up and down with relation to said rings, a handle connected with the carriage to operate it, and an inking attachment comprising a bracket depending adjacent to said rings, a spring-controlled head supported on said bracket to swing in a horizontal plane, a spring-controlled lever hinged to said head to swing with it and carrying an inking-roller, and a bell-crank lever engaging said head and having one arm extended into the path of movement of said carriage, substantially as described.

12. In a time-recorder, the combination with an inclosing case, of a vertically-movable carriage carrying paper-feeding mechanism and a support for the paper to be printed, a clock-movement, horizontally-disposed concentric printing-rings, rotatably supported between said carriage and clock-movement, and lever mechanism engaging said rings and having an actuating connection with said clock-movement to turn said rings at predetermined intervals, and a rotatable handle provided with a crank operatively connected with said carriage and adapted when actuated to raise said support and to carry the support and paper against said printing-rings, substantially as described.

13. In a time-recorder, the combination with an inclosing case, of a vertically-movable carriage carrying paper-feeding mechanism and the paper to be printed, a plate and an impression-pad over which the paper is stretched, a table $A^3$ having a slot $r$ to register with said plate and slots $g$ and $f$, a clock-movement, horizontally-disposed concentric printing-rings M and M' rotatably supported below said slots $g$, $f$, lever mechanism engaging said rings and having an actuating connection with said clock-movement to turn said rings at predetermined intervals and a handle connected with said carriage and adapted when actuated to raise it to bring the paper to said slot $r$ and to carry the plate, pad and paper against the rings M, M', substantially as described.

14. In a time-recorder, the combination with an inclosing case of a carriage movable up and down on its support and carrying paper-feeding mechanism, a plate and an impression-pad over which the web of paper is stretched, a table $A^3$ having a slot $r$ to register with said plate and slots $g$ and $f$, a handle connected with said carriage to operate it, a clock-movement carrying a ratchet-wheel I provided with a cam $h'$, horizontally-disposed concentric printing-rings M and M' rotatably supported below said slots $g, f$, and levers K and K' fulcrumed to engage at the upper side of their fulcrum respectively with said ratchet-wheel and tooth and engaging at their lower ends through said slots $g$ and $f$ with said printing-wheels, substantially as described.

15. In a time-recorder, the combination with an inclosing case of a carriage movable up and down on its support and carrying paper-feeding mechanism, a plate and an impression-pad over which the web of paper is stretched, a table $A^3$ having a slot $r$ to register with said plate and slots $g$ and $f$, a handle connected with said carriage to operate it, a clock-movement carrying a ratchet-wheel I provided with a cam $h'$, horizontally-disposed concentric printing-rings M and M' rotatably supported below said slots $g, f$, and provided about their upper sides with radially-arranged ribs at equal intervals apart, spring-controlled levers K and K' provided at their upper ends with teeth $t$, $t'$ respectively engaging the teeth of said ratchet-wheel and said cam $h'$, and carrying at their lower ends pawls to engage said ribs, and springs $g'$ and $f'$ extending over said slots $g$ and $f$ and carrying cams $g^2$ and $f^2$ engaged by studs on said levers and the detents $g^3$ and $f^3$ extending through said slots into engagement with said ribs, the whole being constructed and arranged to operate substantially as described.

16. In a time-recorder, the combination with the inclosing case of a carriage movable up and down on its support and carrying paper-feeding mechanism, a plate and an impression-pad over which the web of paper is stretched, a table A³ having a slot $r$ to register with said plate, a handle connected with said carriage to operate it, a clock-movement carrying a ratchet-wheel I provided with a cam $h'$, horizontally-disposed rotatable concentric printing-rings M and M', levers K and K' fulcrumed to engage at the upper side of their fulcrum respectively with said ratchet-wheel and cam and engaging at their lower ends with said printing-wheels, and handles on the levers accessible for manipulation by hand to actuate each independently of the other for setting the printing-wheels, substantially as described.

17. In a time-recorder, the combination with the inclosing case, of a clock-movement in the upper part of the case, printing mechanism below and operatively connected with the clock-movement to be actuated thereby at predetermined intervals of time, a vertically-movable carriage carrying paper-feeding mechanism and a support for the paper to be printed, a support for said carriage, and a rotatable handle provided with a crank operatively connected with said carriage and adapted when actuated to raise the paper-support and to carry it and the paper against said printing mechanism, the support for said carriage being removable to separate the carriage and the parts carried thereby at will entirely from the printing mechanism and clock-movement of the apparatus, substantially as described.

18. In a time-recorder, the combination with the inclosing case of a door A⁴, a carriage supported on said door, carrying paper-feeding mechanism and movable up and down on its support, and means for locking the carriage to the case and thereby locking the door against being opened while the carriage is in its normal position, substantially as described.

19. In a time-recorder, the combination of the inclosing case having the table A³ provided with the slot $r$, clock-movement-actuated printing mechanism, a paper-carriage provided with a roll C³ and a roll C carrying the ratchet $m$ and movable up and down with relation to the printing mechanism, a table D and an impression-pad D', one in advance of the other at the top of the carriage and over which the web C' is stretched, a pawl $n^4$ in position to be engaged by said ratchet, and means for raising and lowering the carriage, said carriage, in dropping, feeding the portion of the web exposed at the slot $r$ into alinement with said impression-pad, substantially as described.

JACOB J. BUSENBENZ.

In presence of—
J. H. LEE,
RICHARD SPENCER.